US008884923B2

(12) United States Patent
Tsang et al.

(10) Patent No.: US 8,884,923 B2
(45) Date of Patent: *Nov. 11, 2014

(54) OPTICAL TOUCH APPARATUS HAVING A LIGHT GUIDE WITH SCATTERING PARTICLES

(75) Inventors: Chih-Jen Tsang, Hsin-Chu (TW); Chun-Chien Liao, Hsin-Chu (TW); Yu-Lun Jhu, Hsin-Chu (TW); Cheng-Yi Lien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 1094 days.

This patent is subject to a terminal disclaimer.

(21) Appl. No.: 12/881,176

(22) Filed: Sep. 14, 2010

(65) Prior Publication Data

US 2011/0122094 A1    May 26, 2011

(30) Foreign Application Priority Data

Nov. 25, 2009 (TW) .............................. 98140204 A

(51) Int. Cl.
*G06F 3/042* (2006.01)
*F21V 8/00* (2006.01)

(52) U.S. Cl.
CPC ............ *G06F 3/0428* (2013.01); *G02B 6/0043* (2013.01); *G02B 6/0061* (2013.01); *G02B 6/0028* (2013.01)
USPC ........................................................ 345/175

(58) Field of Classification Search
USPC ................................................. 345/175–176
See application file for complete search history.

(56) References Cited

U.S. PATENT DOCUMENTS

| 2008/0013913 A1* | 1/2008 | Lieberman et al. ............ 385/147 |
| 2008/0047762 A1* | 2/2008 | Lieberman et al. ......... 178/18.01 |
| 2009/0190373 A1* | 7/2009 | Bita et al. ....................... 362/620 |
| 2009/0196069 A1* | 8/2009 | Iwasaki .......................... 362/613 |

FOREIGN PATENT DOCUMENTS

| TW | 200409384 | 6/2004 |
| TW | 200639531 | 11/2006 |
| TW | 200642439 | 12/2006 |

OTHER PUBLICATIONS

"Notice of Allowance of Taiwan counterpart application" issued on Oct. 17, 2013, p1-p2, in which the listed references were cited.

* cited by examiner

*Primary Examiner* — Long D Pham
(74) *Attorney, Agent, or Firm* — Jianq Chyun IP Office

(57) ABSTRACT

An optical touch apparatus includes a light source, light guide unit, and optical detector. The light source next to the display area emits a beam. The light guide unit next to the display area and in the transmission path of the beam includes a light guide body and a Lambertian scattering structure. The light guide body has first, second, third, fourth, and light incident surfaces. The beam enters the light guide body through the light incident surface and is transmitted from the first surface to a sensing space in front of the display area. The Lambertian scattering structure is disposed on at least one of the second, third, and fourth surfaces for scattering the beam to the first surface. The optical detector next to the display area senses a change in light intensity of the beam in the sensing space. An optical touch display apparatus is also provided.

20 Claims, 5 Drawing Sheets

OPTICAL TOUCH APPARATUS HAVING A LIGHT GUIDE WITH SCATTERING PARTICLES

CROSS-REFERENCE TO RELATED APPLICATION

This application claims the priority benefit of Taiwan application serial no. 98140204, filed on Nov. 25, 2009. The entirety of the above-mentioned patent application is hereby incorporated by reference herein and made a part of this specification.

BACKGROUND OF THE INVENTION

1. Field of the Invention

The invention is related to a touch apparatus and a display apparatus, and more particularly, to an optical touch apparatus and an optical touch display apparatus.

2. Description of Related Art

With the development of optoelectronic technology, a user's requirements may no longer be satisfied by using a mouse to control objects in a computer or on a screen. Hence, interfaces more user-friendly than the mouse have been gradually developed. In the user-friendly interfaces, the touch method by using fingers is closest to human experiences in daily life. In particular, elders and children who may not use the mouse agilely may touch with fingers easily. This has been partially proved by the adoption of the touch screen by some automatic teller machines.

In addition, for a conventional laptop computer, if no mouse is externally connected, a touch pad or a track point next to the keys is usually used to control the cursor. However, for ordinary users, the cursor might not be controlled as agilely by the touch pad or the track point next to the keys than by a mouse. A touch panel disposed on the monitor is able to solve such a problem. This is because the control method of the touch panel is an intuitive control method in which the user directly touches the monitor to control the objects. Therefore, when the touch panel is applied to the laptop computer, even if the operating conditions make it inconvenient for the user to externally connect the mouse, the user is still capable of agilely operating the computer by the touch panel.

Currently, touch panels are roughly classified into resistive-type, capacitive-type, optical-type, acoustic-wave-type, and electromagnetic-type. Generally, an optical-type touch panel includes a display, a light source, a light guide unit, a detector, and a processor. The light source is disposed next to a display area to generate a beam. The beam passes through the light guide unit and then is detected by the detector. When an object touches the panel, the processor determines a position of a touch point according to a change in light intensity detected by the detectors. In addition, the uniformity of the luminance of the beam passed through the light guide board affects the accuracy in determining the touch point. The accuracy may be higher when the luminance is more uniform. However, according to prior art, the luminance of the beam which has passed through the light guide board is non-uniform, so that the accuracy in determining the position of the touch point is also lower.

SUMMARY OF THE INVENTION

The invention provides an optical touch apparatus having higher accuracy in determining a touch point.

The invention provides an optical touch display apparatus having higher accuracy in determining the touch point.

Other objects and advantages of the invention may be further comprehended by reading the technical features described in the invention as follows.

An embodiment of the invention provides an optical touch apparatus suitable for a display area. The optical touch apparatus includes at least a light source, at least a light guide unit, and at least an optical detector. The light source is disposed next to the display area and capable of providing a beam. The light guide unit is disposed next to the display area and in the transmission path of the beam. The light guide unit includes a light guide body and a Lambertian scattering structure. The light guide body has a first surface, a second surface opposite to the first surface, at least a light incident surface connecting the first surface and the second surface, a third surface connecting the light incident surface, the first surface, and the second surface, and a fourth surface opposite to the third surface and connecting the light incident surface, the first surface, and the second surface. The beam is capable of entering the light guide body through the light incident surface and being transmitted from the first surface to a sensing space in front of the display panel. The Lambertian scattering structure is disposed on at least one of the second surface, the third surface, and the fourth surface, such that the beam is scattered to the first surface and a root mean square value of differences between light intensity of a normalized light intensity distribution curve of the beam emitted from the first surface at each light emission angle and light intensity of a Lambertian normalized light intensity distribution curve at the same angle is equal to or less than 0.2. The optical detector is disposed next to the display panel and used to detect a change in light intensity of the beam in the sensing space.

Another embodiment of the invention provides an optical touch display apparatus including a display and the above optical touch apparatus, wherein the display has the above display area.

Due to the above mentions, the embodiments of the invention may have at least one of the following advantages. Since the optical touch apparatus and the optical touch display apparatus of the embodiments of the invention adopt the Lambertian scattering structure, the light shape of the beam emitted from the first surface is similar to a Lambertian intensity distribution, so that the luminance of the first surface detected by the optical detector is more uniform, thereby enhancing the accuracy in determining the position of the touch point by the optical touch apparatus and the optical touch display apparatus.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
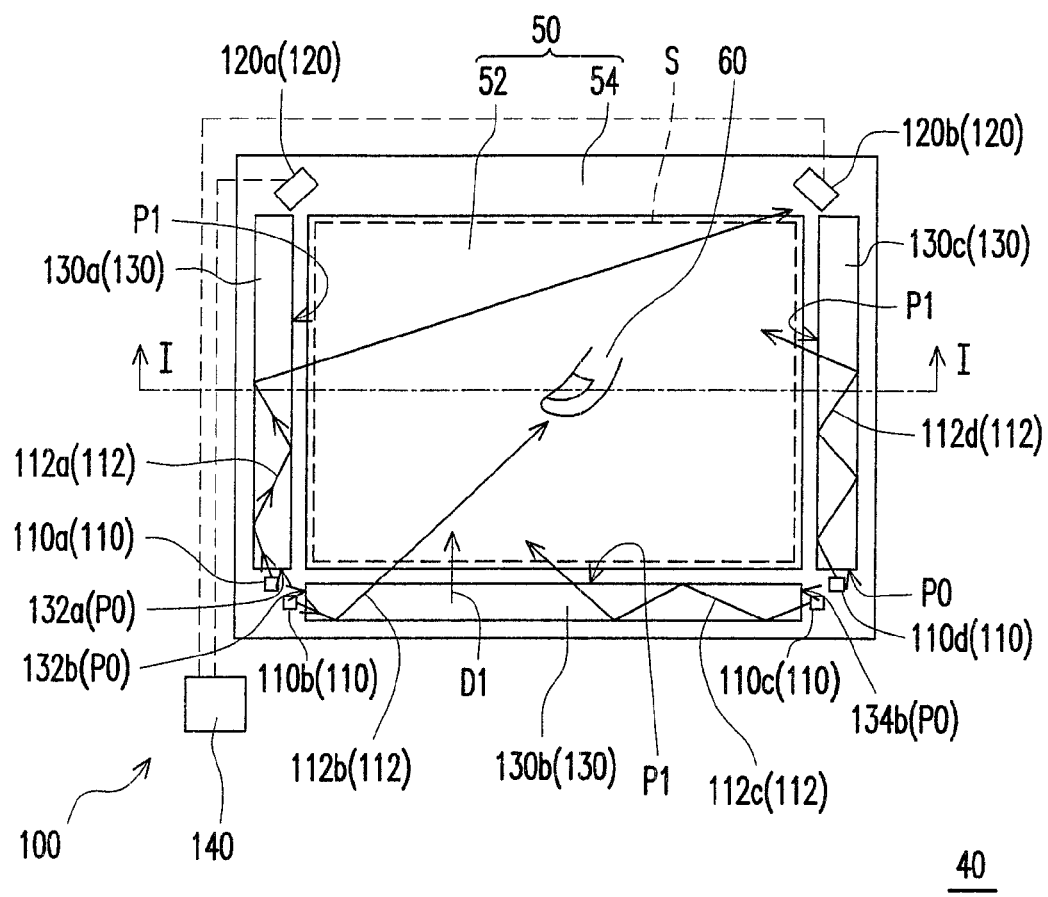
FIG. 1A is a structural schematic diagram of an optical touch display apparatus according to an embodiment of the invention.
Figure 1B:
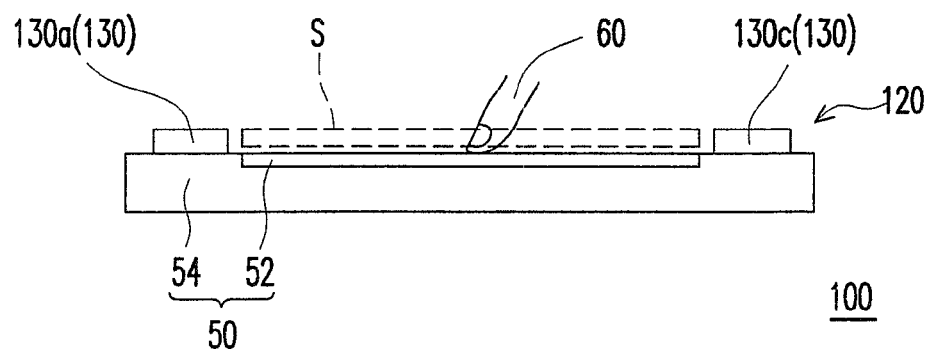
FIG. 1B is a schematic cross-sectional view of an optical touch apparatus in FIG. 1A along line I-I.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Referring to FIGS. 1A, 1B, and 2A to 2C, an optical touch display apparatus 40 of the embodiment includes a display 50 and an optical touch apparatus 100. According to the embodiment, the display 50 includes a display area 52 and an outer frame 54 surrounding the display area 52. According to the embodiment, the optical touch apparatus 100 may be disposed on the outer frame 54 or be integrated as a part of the outer frame 54. The display 50 is, for example, a liquid crystal display (LCD), a plasma display panel (PDP), an organic light emitting diode (OLED) display, a cathode ray tube (CRT) display, a rear projection display or another kind of display, while the display area 52 is a surface for displaying frames to a user. According to other embodiments, the display area 52 may also be a display region on a projection screen, and the optical touch apparatus 100 is capable of being used with a projection apparatus and disposed next to the display region on the projection screen.

The optical touch apparatus 100 includes at least a light source 110 (four light sources 110a, 110b, 110c, and 110d are exemplarily shown in FIG. 1), at least a light guide unit 130 (three light guide units 130a, 130b, and 130c are exemplarily shown in FIG. 1), and at least an optical detector 120 (two optical detectors 120a and 120b are exemplarily shown in FIG. 1). The light source 110 is disposed next to the display area 52 and is capable of emitting a beam 112. The light guide unit 130 is disposed next to the display area 52 and is disposed in the transmission path of the beam 112. Specifically, the light sources 110a, 110b, 110c, and 110d respectively emit beams 112a, 112b, 112c, and 112d, the light guide unit 130a is disposed in the transmission path of the beam 112a, the light guide unit 130b is disposed in the transmission paths of the beams 112b and 112c, and the light guide unit 130c is disposed in the transmission path of the beam 112d.

According to the embodiment, the light source 110 includes an invisible light emitting diode capable of emitting an invisible beam. For example, the light source 110 is an infrared light emitting diode, and each of the beams 112a, 112b, 112c, and 112d is an infrared beam.

The optical detectors 120a and 120b are disposed next to the display area 52. Each of the optical detectors 120a and 120b is, for example, a complementary metal-oxide-semiconductor sensor (CMOS) sensor, a charge coupled device (CCD) sensor, a photomultiplier (PMT) or another type of suitable image sensor.

The light guide unit 130 includes a light guide body 131 and a scattering structure 150. The light guide body 131 has a first surface P1, a second surface P2 opposite to the first surface P1, and at least a light incident surface P0 connecting the first surface P1 and the second surface P2. The beam 112 is capable of entering the light guide body 131 through the light incident surface P0, and is capable of transmitting from the first surface P1 to a sensing space S (the space surrounded by the broken lines) in front of the display area 52.

According to the embodiment, the light guide body 131 further includes a third surface P3 and a fourth surface P4. The third surface P3 is connected to the light incident surface P0, the first surface P1, and the second surface P2. The fourth surface P4 is opposite to the third surface P3 and is connected to the light incident surface P0, the first surface P1, and the second surface P2. According to the embodiment, the light guide unit 130 further includes a reflector 133 disposed on at least one of the second surface P2, the third surface P3, and the fourth surface P4. Specifically, the reflector 133 is, for example, a reflecting sheet disposed on the second surface P2, the third surface P3, and the fourth surface P4.

According to the embodiment, the scattering structure 150 is, for example but not limited to, a Lambertian scattering structure and the scattering structure 150 is disposed on the second surface P2 of the light guide body 131. According to other embodiments, the scattering structure 150 may also be disposed on at least one of the second surface P2, the third surface P3, and the fourth surface P4 of the light guide body 131, so that the beam 112 is scattered to the first surface P1 and the a root mean square value D of the differences between the light intensity of the normalized light intensity distribution curve of the beam 112 emitted from the first surface P1 at each light emission angle and the light intensity of a Lambertian normalized light intensity distribution curve at the same angle is equal to or less than 0.2. Specifically, the normalized light intensity distribution curve may be represented by I(θ), meaning that the light intensity I is a function of the light emission angle θ. The range of the light emission angle θ is from −90 to +90 degrees, wherein the direction corresponding to 0 degree is defined as the light emission direction (i.e. the light emission direction D1 if the light guide unit 130b is used as an example) perpendicular to the first surface P1; the direction in which the light emission angle θ is positive is clockwise on the figure, and the direction in which the light emission angle θ is negative is counter-clockwise on the figure. In addition, the Lambertian normalized light intensity distribution curve may be represented by L(θ), wherein L(θ) =cos θ, and the range of θ is from −90 to +90 degrees. By using the Lambertian scattering structure according to the embodiment, the normalized light intensity distribution of the beam 112 emitted from the first surface P1 complies with the following equation:

Root Mean Square Value of the Differences Between the Light Intensity $$D = \sqrt{\frac{\sum (I(\theta) - L(\theta))^2}{N}} \leq 0.2$$

In other words, the light intensity distribution of the beam 112 emitted from the first surface P1 is similar to the Lambertian distribution, so that the luminance of the first surface P1 is uniform. According to the embodiment, the above root mean square value D is, for example, 0.063106. However, according to other embodiments, the above root mean square value may be 0.075269, 0.121543 or another value equal to or smaller than 0.2.

According to the embodiment, the light guide units 130a and 130b are respectively disposed at two adjacent sides of the display area 52, the light guide units 130b and 130c are respectively disposed at two adjacent sides of the display area 52, and the light guide units 130a and 130c are respectively disposed at two opposite sides of the display area 52. The first surface P1 of the light guide unit 130 may face the sensing space S. The first surface P1 of the light guide unit 130a and the first surface P1 of the light guide unit 130b are in the detection range of the optical detector 120b, and the first surface P1 of the light guide unit 130b and the first surface P1 of the light guide unit 130c are in the detection range of the optical detector 120a. The optical detector 120 is used to detect the change in the light intensity of the beam 112 in the sensing space S. According to the embodiment, the optical touch apparatus 100 further includes a processing unit 140 electrically connected to the optical detector 120 (i.e. electrically connected to the optical detectors 120a and 120b). When a touch object 60 enters the sensing space S, the processing unit 140 determines the position of the touch object relative to the display area 52 according to the change in light intensity.

Specially, when the touch object 60 approaches or touches the display area 52, the touch object 60 blocks the beam 112 emitted from the first surface P1 of each light guide unit 130a, 130b, and 130c and entering the optical detectors 120a and 120b, so that there are dark spots on the images sensed by the optical detectors 120a and 120b. By analyzing the positions of the dark spots, the processing unit 140 is able to calculating the position of the touch object 60 relative to the display area 52 and achieving a touch effect thereby. The touch object 60 is, for example, the finger of the user, a tip of a stylus or another suitable object. In addition, the processing unit 140 is, for example, a digital signal processor (DSP) or another kind of suitable processing circuit. The processing unit may be electrically connected to a processor of an operating platform, such as a computer, a cell phone, a personal digital assistant (PDA), a digital camera or to processors of other electronic devices, and the processor of the operating platform is capable of converting a signal of the position of the touch object 60 relative to the display area 52 into kinds of control functions. According to other embodiments, the position of the touch object 60 relative to the display area 52 is calculated by the processor of the operating platform instead of the processing unit 140.

According to the embodiment, the scattering structure 150 includes a plurality of scattering patterns 152 separated from each other. The scattering patterns 152 are, for example, scattering patterns making the beam 112 emitted from the first surface P1 have a light intensity distribution similar to the Lambertian intensity distribution. The scattering patterns 152 are arranged in a direction substantially perpendicular to the light incident surface P0 (the normal direction of the surface). In addition, according to the embodiment, the number density of the scattering patterns 152 at a position close to the light source 110 is less than the number density of the scattering patterns 152 at a position far away from the light source 110. For example, the number density of the scattering patterns 152 increases along the direction away from the light source 110. Moreover, the light guide unit 130b has two light incident surfaces P0 opposite to each other, wherein the surfaces P0 are the light incident surfaces 132b and 134b. The light sources 110b and 110c are respectively disposed next to the two light incident surfaces 132b and 134b opposite to each other, and the number density of the scattering patterns 152 at a position close to one of the light incident surfaces 132b and 134b is less than the number density of the scattering patterns 152 at a position in the middle of the light incident surfaces 132b and 134b. For example, the number density of the scattering patterns 152 increases from two ends of the light guide unit 130b towards the middle.

In addition, the light guide body 131 of the light guide unit 130a (referring to FIG. 2D) has one light incident surface P0, which is a light incident surface 132a. The number density of the scattering patterns 152 increases from the end close the light incident surface 132a to the end away from the light incident surface 132a. The light guide unit 130c and the scattering patterns 152 on the light guide unit 130c are similar to the light guide unit 130a and the scattering patterns 152 on the light guide unit 130a, while the difference in between is that the positions of the first surface P1 and the second surface P2 of the light guide unit 130c are opposite from the positions of the first surface P1 and the second surface P2 of the light guide unit 130a.

Since the optical touch apparatus 100 according to the embodiment adopts the Lambertian scattering structure (which is the scattering structure 150), the light intensity distribution of the beam 112 emitted from the first surface P1 is similar to the Lambertian distribution, and the luminance on the first surface P1 is uniform. Therefore, when the touch object 60 does not enter the sensing space S, the optical detector 120 is able to detect uniform luminance at each sensing angle. Hence, when the touch object 60 enters the sensing space S, the processing unit 140 is capable of accurately calculating the position of the touch object 60 relative to the display area 52 by analyzing data of the light intensity distribution transmitted from the optical detector 120, so that the problem of misjudgment of the position of the touch object 60 caused by non-uniform luminance on the first surface P1 is improved.

According to the embodiment, each of the scattering patterns 152 includes a resin composition 154 and a plurality of scattering particles 156. The resin composition 154 is, for example but not limited to, a transparent ink layer, and the resin composition 154 is disposed on the second surface P2. According to other embodiments, the resin composition 154 may also be disposed on at least one of the second surface P2, the third surface P3, and the fourth surface P4. The scattering particles 156 are dispersed in the resin composition 154. Through cooperation of the resin composition 154 and the scattering particles 156, the Lambertian scattering structure is formed. In the invention, the Lambertian scattering structure is not limited to being formed by the resin composition and the scattering particles. According to other embodiments, the Lambertian scattering structure may also be any structure capable of making the beam 112 emitted from the first surface P1 have a light intensity distribution similar to the Lambertian intensity distribution.

Figure 3A:
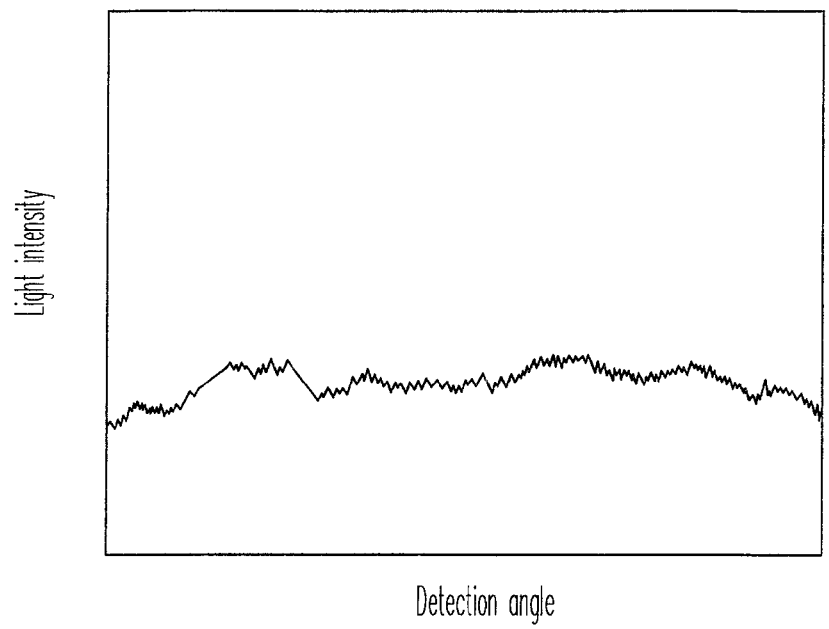
FIG. 3A is a light intensity distribution diagram of a first surface of the light guide unit detected by an optical detector in FIG. 1A.
Figure 3B:
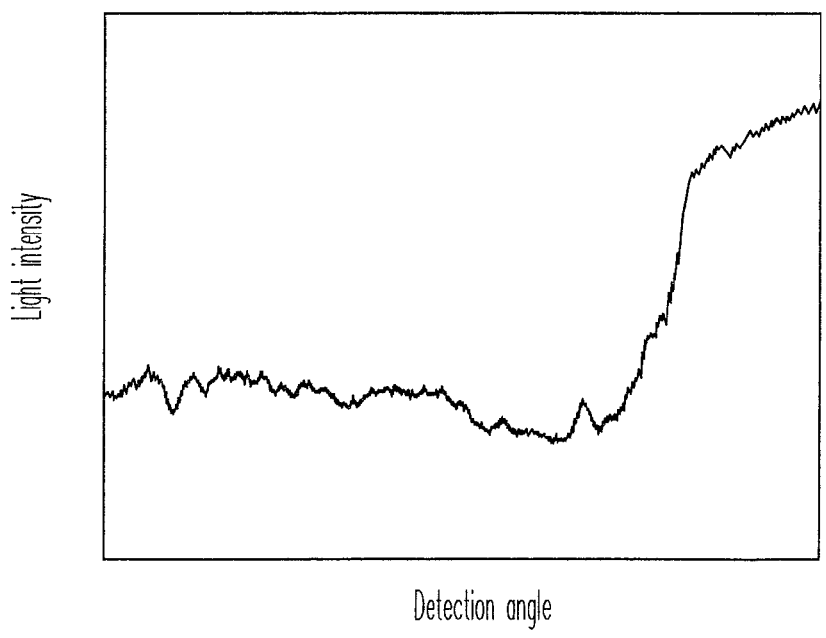
FIG. 3B is a light intensity distribution diagram of the first surface of the light guide unit detected by the optical detector when the scattering structure is only formed by a transparent ink layer.

Referring to both FIGS. 3A and 3B, from left to right, the angular range of detection by the optical detector 120$a$ is from the light incident surface 132$b$ of the light guide unit 130$b$ to the light incident surface 134$b$ of the light guide unit 130$b$. Referring to FIG. 3B, when the scattering structure is formed by the transparent ink layer without scattering particles, the light emission angle θ of the beam 112 emitted from the first surface P1 and by the light source 110$b$ deviates towards the positive direction, and the light emission angle θ of the beam 112 emitted from the first surface P1 and by the light source 110$c$ deviates towards the negative direction. Hence, the beam 112 emitted by the light source 110$c$ directly irradiates the optical detector 120$a$ and causes a stronger light intensity, and the beam 112 emitted by the light source 110$b$ deviates from the optical detector 120$a$ and causes a weaker light intensity. Hence, the light intensity distribution in FIG. 3B is non-uniform and is higher in the right side of FIG. 3B, thereby easily causing misjudgment of a position of a touch point. Still referring to FIG. 3A, since the optical touch apparatus 100 according to the embodiment adopts the transparent ink layer with the scattering particles 156, the light intensity distribution of the beam 112 emitted from the first surface P1 of the light guide unit 130$b$ is similar to the Lambertian intensity distribution. Hence, the optical detector 120$a$ is capable of detecting the uniform light intensity distribution as shown in FIG. 3A, and effectively lowering the misjudgment rate of the position of the touch point by the optical touch apparatus 100 and the optical touch display apparatus 40 according to the embodiment. In other words, the accuracy in determining the position of the touch point by the optical touch apparatus 100 and the optical touch display apparatus 40 is enhanced.

In order to make clear the characteristics of the invention, the following illustrates the scattering structure 150 in detail. The scattering structure 150 has the plurality of scattering patterns 152 separated from each other, and the scattering patterns 152 are disposed on at least one of the second surface P2, the third surface P3, and the fourth surface P4 opposite to the light emitting surface of the light guide body 131. In particular, a designer may adjust the composition ratio of the resin composition 154 to the scattering particles 156 in the scattering patterns 152 to adjust the emitted light shape of the beam 112, so that the beam 112 achieves a uniform effect. In application, by adjusting a suitable ratio of the resin composition 154 to the scattering particles 156 in the scattering patterns 152, the normalized light intensity distribution curve of the beam 112 achieves an effect similar to the effect of the Lambertian normalized light intensity distribution curve.

In detail, each of the scattering patterns 152 includes the resin composition 154 and the scattering particles 156, and the scattering particles 156 are dispersed in the resin composition 154. It should be noted that the contents of the scattering particles 156 and the resin composition 154 in the scattering patterns are calculated as weight percentages. In other words, when the ratio of the weight percentage of the scattering particles 156 in the scattering patterns 152 to the weight percentage of the resin composition 154 in the scattering patterns 152 is equal to or greater than 0.1, the scattering patterns 152 may be sufficiently used to adjust the light shape of the beam 112. As shown in FIGS. 3A and 3B described above, when the content of the scattering particles 156 in the scattering patterns 152 comply with the above relationship, the beam 112 emitted from the light guide body 131 are more uniform, so that the optical detector 120 effectively detects whether the light intensity is changed caused by touching in the sensing space S, so as to prevent misjudgment of touching.

Figure 2A:
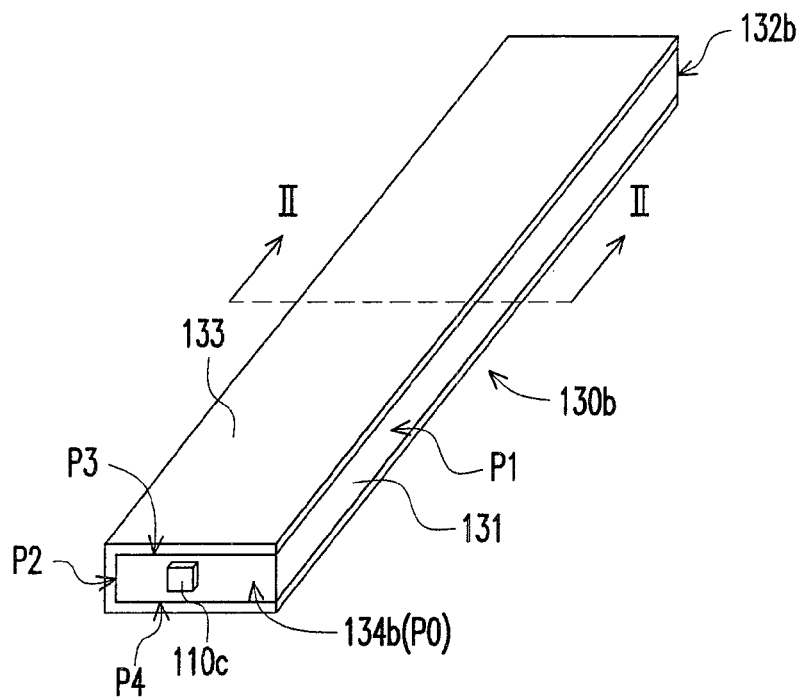
FIG. 2A is a three-dimensional view of a light guide unit and a light source in FIG. 1A.
Figure 2B:
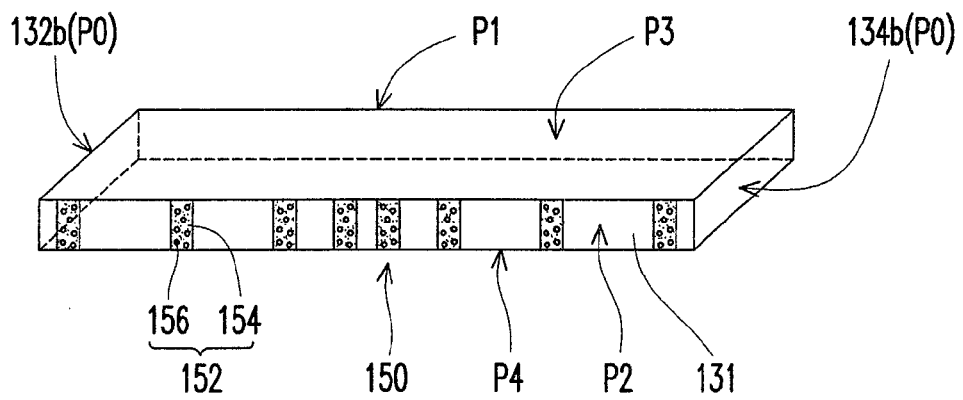
FIG. 2B is a three-dimensional view of a light guide body and a scattering structure in FIG. 2A.
Figure 2C:
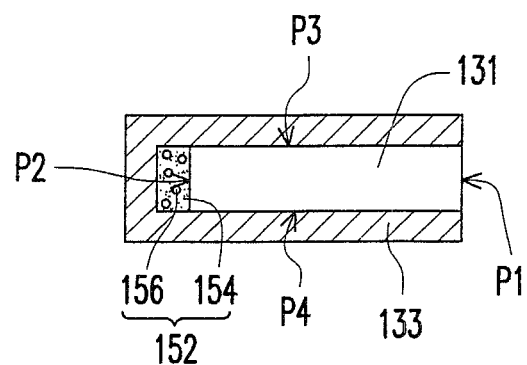
FIG. 2C is a schematic cross-sectional view of the light guide unit in FIG. 2A along line II-II.
Figure 2D:
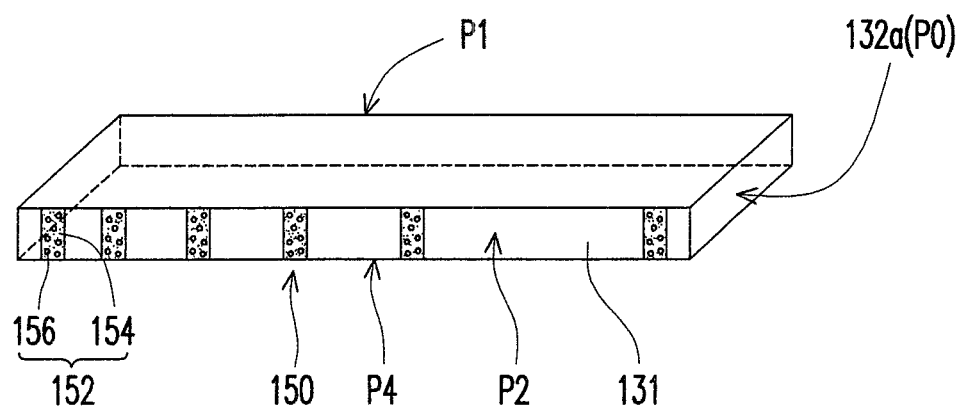
FIG. 2D is a three-dimensional view of the light guide body and scattering structure of the light guide unit in FIG. 1A.

In addition, according to the embodiment, since the content of the scattering particles 156 in the scattering patterns 152 is less than the content of the resin composition 154 in the scattering patterns 152, for example, the ratio of the scattering particles 156 to the resin composition 154 is 0.1, in each of the scattering patterns 152 as shown in FIGS. 2B to 2D, the resin composition 154 may be viewed as a continuous phase, the scattering particles 156 may be viewed as a dispersed phase dispersed in the continuous phase, and the scattering particles 156 are, for example, embedded in the resin composition 154.

In application, by adjusting the composition ratio of the resin composition 154 to the scattering particles 156 in the scattering pattern 152, the light shape of the beam 112 which has passed through the scattering patterns 152 are more suitable for product requirements. For example, in one kind of application, if the light shape of beam emitted from the light guide body 131 is to comply with the Lambertian light shape, the ratio of the scattering particles 156 to the resin composition 154 may be appropriately increased. Specifically, the ratio of the scattering particles 156 to the resin composition 154 is preferably smaller than or equal to 1.5. The contents of the scattering particles 156 and the resin composition 154 are calculated in weight percentages. Moreover, in practice, from a view of light usage efficiency, when the contents of the scattering particles 156 and the resin composition 154 in the scattering patterns 152 are calculated in weight percentages, the ratio of the scattering particles 156 to the resin composition 154 is preferably from 0.5 to 1.5.

In other words, when the content of the scattering particles 156 in the scattering patterns 152 is greater than the content of the resin composition 154 in the scattering patterns 152, for example, the ratio of the scattering particles 156 to the resin composition 154 is 1.5, the scattering particles may protrude from the surface of the resin composition, so that the surface of the resin composition is slightly uneven. The invention does not limit the status of the scattering particles dispersed in the resin composition.

Figure 4A:
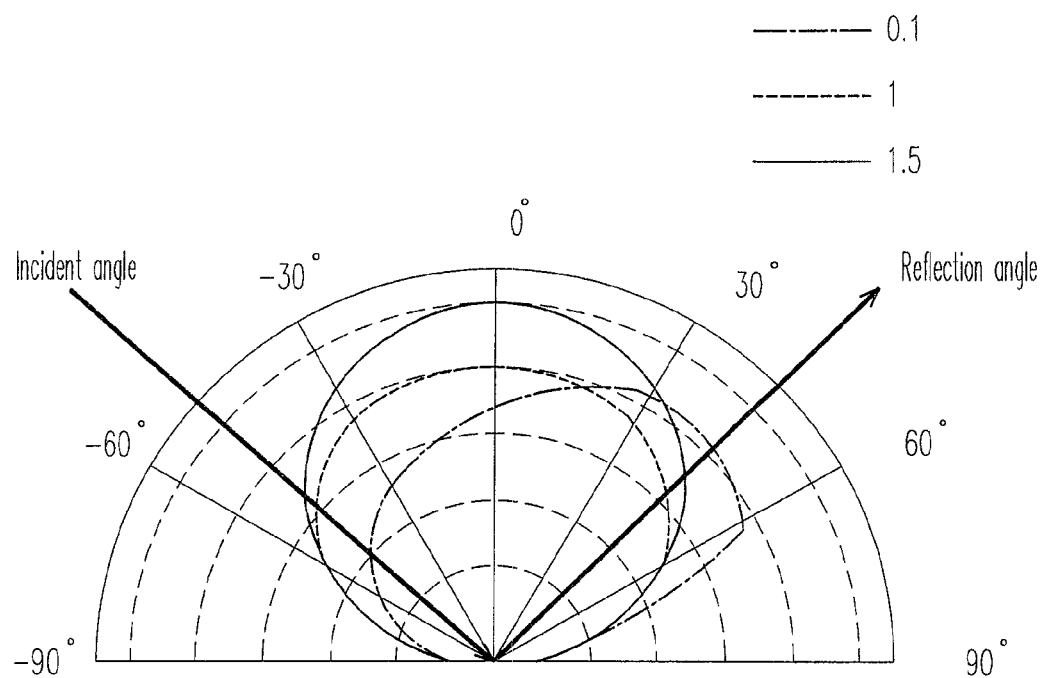
FIG. 4A is a light intensity distribution curve diagram of a light beam emitted from a first surface of the light guide body which has passed through the scattering pattern according to an embodiment of the invention, in which there are different ratios of scattering particles to a resin composition.

Referring to FIG. 4A, the range of the light emission angle θ is from −90 to +90 degrees. FIG. 4A shows the light shapes of the beam 112 under the conditions that the ratio of the scattering particles 156 to the resin composition 154 is 0.1, 1 or 1.5. As shown in FIG. 4A, when the ratio of the scattering particles 156 and the resin composition 154 changes, the light intensity distribution curve diagram of the beam 112 changes accordingly. In detail, when the weight percentage of the scattering particles 156 in the scattering patterns 152 to the weight percentage of the resin composition 154 in the scattering patterns 152 is equal to or greater than 0.1, the light shape of the emitted beam 112 is substantially changed. Moreover, as shown in FIG. 4A, when the ratio of the weight percentage of the scattering particles 156 in the scattering patterns 152 to the weight percentage of the resin composition 154 in the scattering patterns 152 is 1 or 1.5, the light shape of the beam 112 passed through the scattering patterns 152 is similar to that of Lambertian light.

It should be noted that, the ratio of the scattering particles 156 to the resin composition 154 in the scattering patterns 152 is not specifically limited; as long as the scattering particles 156 added into the resin composition 154 are sufficient to adjust the emitted light shape of the beam 112 are achieved. In other words, if the ratio of the weight percentage of the scattering particles 156 in the scattering patterns 152 to the weight percentage of the resin composition 154 in the scattering patterns 152 is equal to or greater than 0.1, the scattering patterns 152 are capable of substantially adjusting the emitted beam 112 to have a predetermined light shape. For example, as shown in FIG. 4A, in an application wherein the predetermined light shape is the Lambertian light shape, the ratio of the scattering particles 156 to the resin composition 154 in the scattering patterns 152 may be adjusted to substantially 1 or 1.5, so that the emitted beam 112 is adjusted to have the predetermined Lambertian light shape. Hence, in the invention, the ratio of the scattering particles 156 to the resin composition 154 in the scattering patterns 152 is not limited to a specific value, but is suitably adjusted according to predetermined requirements on the light shape of the emitted beam.

In addition, for the same light guide body 131, the invention does not limit that the composition ratio of the scattering particles 156 to the resin composition 154 in the scattering patterns 152 of the same light guide body 131 has to be the same. In detail, for the same light guide body 131, in the scattering patterns 152 located at different positions, the ratio of the scattering particles 156 to the resin composition 154 may be adjusted according to the positions of the scattering patterns 152 relative to the optical detectors 120, the number of the optical detectors 120, and the number of the light guide bodies 131 in the light guide unit 130. In other words, each ratio of the scattering particles 156 to the resin composition 154 in the plurality of scattering patterns 152 on the same light guide body 131 may be substantially different from each other. Alternatively, considering the obtainment of raw materials, mass productivity, and the cost of manufacturing, for the scattering patterns 152 on the same light guide body, slight variation between each ratio of the scattering particles 156 to the resin composition 154 in the scattering patterns 152 is allowable, so that each ratio of the scattering particles 156 to the resin composition 154 in the scattering patterns 152 may be substantially different from each other.

Based on the above concept, a designer may adjust the compositions of the scattering patterns 152 on different positions of each of the light guide bodies 131 according to the size of the optical touch apparatus, the characteristics (such as the refractive index) of the light guide unit 130, and the relative positions of the light guide unit 130 and the optical detector 120, so that the beam 112 emitted from the light guide body 131 is uniform. Hence, the detection sensitivity and the accuracy in determining the touch point by the optical detector 120 are enhanced, so as to prevent the optical touch apparatus from performing unwanted functions.

When the ratio of the scattering particles 156 to the resin composition 154 in the scattering patterns 152 is equal to or greater than 0.1, the designer may further fine tune the directivity of the beam 112 in an auxiliary manner by adjusting the particle size of the scattering particles. Details are described below with reference to FIG. 4B. The particle size of the scattering particles 156 is not specifically limited. In detail, according to the embodiment, the particle size of the scattering particles 156 is substantially in the range from 1 μm to 30 μm.

Figure 4B:
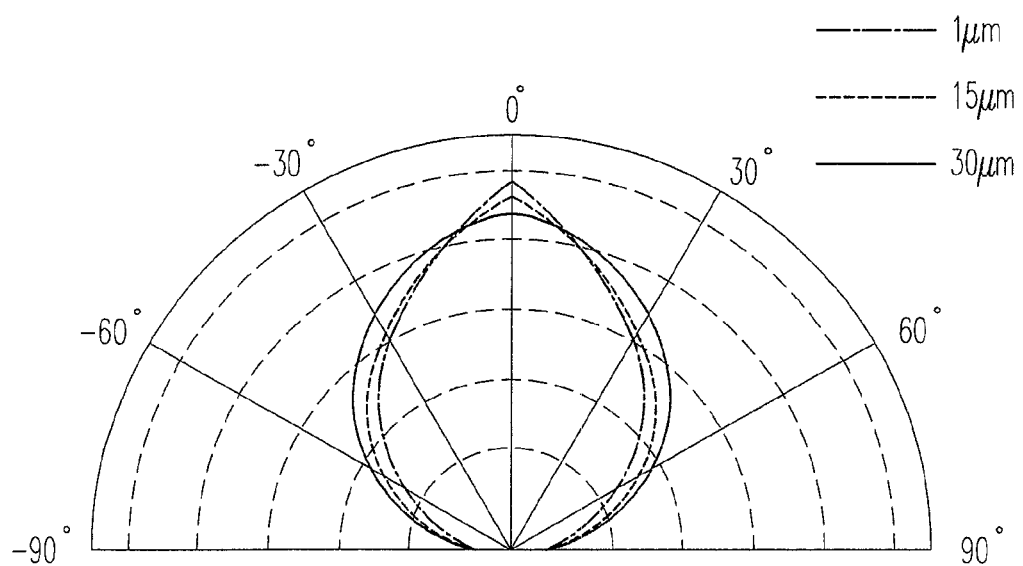
FIG. 4B is a light intensity distribution curve diagram of the light beam emitted from the first surface of the light guide body which has passed through the scattering pattern having scattering particles with different particles sizes according to an embodiment of the invention.

Referring to FIG. 4B, the range of the light emission angle θ is from −90 to +90 degrees, and FIG. 4B shows the light shape of the emitted beam when the particle size of the scattering particles is 1 μm, 15 μm, and 30 μm. As shown in FIG. 4B, when the particle size of the scattering particles is 1 μm, the light intensity is stronger when the light emission angle is 0 degree. In other words, the emitted beam has higher optical directivity. On the other hand, when the particle size of the scattering particles is 15 μm, compared with the light intensity distribution when the particle size is 1 μm, the light intensity distribution is more uniform when the particle size is 15 μm. Still referring to FIG. 4B, when the particles size of the scattering particles is 30 μm, the light intensity distribution of the beam that has passed through the scattering patterns is further uniformed.

In other words, when the particle size of the scattering particles 156 is smaller, the optical directivity of the beam 112 which has passed through the scattering pattern 152 is enhanced; when the size of the scattering particles 156 is close to the wavelengths of visible light, there tends to be slight loss in optical energy, and the light usage efficiency is lowered. On the other hand, when the particles size of the scattering particles 156 is larger, the light usage efficiency of the beam 112 which has passed through the scattering patterns 152 is enhanced. According to the embodiment, the particles size of the scattering particles 156 is substantially equal to 2 μm, so that the optical directivity and light usage efficiency of the beam 112 which has passed through the scattering patterns 152 are optimized.

On the basis of adjusting the emitted light shape of the beam 112 by the scattering patterns 152, by considering other design requirements, the refractive index of the scattering patterns 152 may be further adjusted according to the ratio of the scattering particles 156 to the resin composition 154, the refractive index of the scattering particles 156, and the refractive index of the resin composition 154, so that the light usage efficiency of the beam is further enhanced while changing the emitted light shape. According to the embodiment, the refractive index of the light guide body 131 is, for example, 1.49. In order to enhance the light usage efficiency, in the scattering patterns 152 arranged on the second surface P2, the refractive index of the resin composition 154 is in the range from 1.4 to 1.55, and the refractive index of the scattering particles 156 is in the range from 1.4 to 1.7.

In terms of manufacturing, the above scattering structure 150 may be manufactured by print fabrication. In further detail, the resin composition 154, the scattering particles 156, and a solvent may be pre-mixed to form a scattering material.

Next, the scattering material is, for example, sprayed on the light guide body 131 by a printing process. In addition, a curing process is used for removing the solvent to cure the scattering material sprayed on the light guide body 131, and the plurality of scattering patterns 152 divided from each other form the scattering structure 150. The curing process is, for example, an ultraviolet light curing process or a baking process. Hence, according to the actual printing process, a solvent with a suitable material and viscosity may be selected. For example, according to the embodiment, the solvent is a composition including 90% 3,5,5-trimethyl-2-cyclohexene-1-one and 10% 4-methyl-3-penten-2-one.

The following further describes the resin composition 154 and the scattering particles 156 in the scattering patterns 152.

The resin composition: in terms of light usage efficiency, according to an embodiment, a material having high optical transmittance in the visible light range may be selected as the resin composition. For example, the optical transmittance of the resin composition in the visible light range is equal to or greater than 90%, and the resin composition in the scattering patterns is, for example, the transparent ink layer. Specifically, a composition used to form the resin composition includes polymethyl methacrylate resin. According to the embodiment, the constituents for forming the resin composition further include an aromatic hydrocarbon compound, a dibasic ester, cyclohexanone, and silicon dioxide.

In terms of the fact that the resin composition has superb optical transmittance and good light usage efficiency, the contents of each compound in the constituents of the resin composition comply with the following relationships: the content of the poly methylmethacrylate resin is, for example, 20-30 wt %, the content of the aromatic hydrocarbon compound is 20-30 wt %, the content of the dibasic ester is 20-30 wt %, the content of the cyclohexanone is 10-20 wt %, and the content of the silicon dioxide in the resin composition is equal to or less than 10 wt %.

The scattering particles: the scattering particles are particles capable of making incident light beams have different emission directions. The particle size of the scattering particles is, for example, 1 μm to 30 μm, and the selection of the particle size and considerations for the refractive index are illustrated above and hence not repeated described. Specifically, the scattering particles may include, but are limited to, one of titanium dioxide, silicon dioxide, and poly methylmethacrylate resin, or any combination thereof. According to other embodiments, other scattering particles may be selected.

The scattering patterns 152 formed by mixing the resin composition and the scattering particles 156 which comply with the above relationships have effects of sufficiently changing the emitted light shape of the beam 112 and have superb light usage efficiency, so that the light guide unit 130 utilizing the scattering patterns 152 has effects of the uniform light intensity distribution. Therefore, compared with a conventional optical touch apparatus, the optical touch apparatus of the invention utilizes the scattering patterns 152 having the resin composition 154 and the scattering particles 156, and the resin composition 154 and the scattering particles 156 comply with specific relationships, so that light uniformity of the beam passed through the light guide unit 130 and been emitted into the sensing space is enhanced, thereby enhancing the accuracy in determining the touch point by the optical touch apparatus.

In summary, the embodiments of the invention may have at least one of the following advantages. Since the optical touch apparatus and the optical touch display apparatus of the embodiments of the invention adopt the Lambertian scattering structure, the light shape of the beam emitted from the first surface is similar to a Lambertian intensity distribution, so that the luminance of the first surface detected by the optical detector is more uniform and the accuracy in determining the touch point by the optical touch apparatus and the optical touch display apparatus is enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical touch apparatus, suitable for a display area, the optical touch apparatus comprising:
  at least a light source, disposed next to the display area and capable of providing a beam;
  at least a light guide unit, disposed next to the display area and in a transmission path of the beam, the light guide unit comprising:
    a light guide body, having a first surface, a second surface opposite to the first surface, at least a light incident surface connecting the first surface and the second surface, a third surface connecting the light incident surface, the first surface, and the second surface, and a fourth surface opposite to the third surface and connecting the light incident surface, the first surface, and the second surface, wherein the beam is capable of entering the light guide body through the light incident surface and is capable of being transmitted from the first surface to a sensing space in front of the display area; and
    a Lambertian scattering structure, disposed on at least one of the second surface, the third surface, and the fourth surface, such that the beam is scattered to the first surface and a root mean square value of differences between light intensity of a normalized light intensity distribution curve of the beam emitted from the first surface at each light emission angle and light intensity of a Lambertian normalized light intensity distribution curve at the same angle is equal to or less than 0.2; and at least an optical detector, disposed next to the display area and used to detect a change in light intensity of the beam in the sensing space.

2. The optical touch apparatus of claim 1, wherein the Lambertian scattering structure comprises a plurality of Lambertian scattering patterns divided from each other, each of the Lambertian scattering patterns comprising:

a transparent ink layer; and a plurality of scattering particles, doped in the transparent ink layer.

3. The optical touch apparatus of claim 2, wherein a ratio of a weight percentage of the scattering particles to a weight percentage of the transparent ink layer is from 0.1 to 1.5.

4. The optical touch apparatus of claim 1, further comprising a processing unit electrically connected to the optical detector, wherein the processing unit determines a position of the touch object relative to the display area according to the change in the light intensity, when a touch object enters the sensing space.

5. The optical touch apparatus of claim 1, wherein the Lambertian scattering structure comprises a plurality of Lambertian scattering patterns divided from each other, and a number density of the Lambertian scattering patterns at a position close to the light source is less than a number density of the Lambertian scattering patterns at a position away from the light source.

6. The optical touch apparatus of claim 1, wherein the Lambertian scattering structure comprises a plurality of Lambertian scattering patterns divided from each other, and the Lambertian scattering patterns are arranged in a direction substantially perpendicular to the light incident surface.

7. The optical touch apparatus of claim 1, wherein the light guide body further comprises a reflector, disposed on at least one of the second surface, the third surface, and the fourth surface.

8. The optical touch apparatus of claim 1, wherein the at least one light guide unit are three light guide units, the at least one light source are four light sources, a first light guide unit and a second light guide unit of the three light guide units are respectively disposed at two adjacent sides of the display area, the second light unit and a third light guide unit of the three light guide units are respectively disposed at two adjacent sides of the display area, and the first light guide unit and the third light unit are respectively disposed at two opposite sides of the display area, the first light guide unit being disposed in a transmission path of a beam emitted by a first light source of the four light sources, the second light guide unit being disposed in a transmission path of a beam emitted by a second light source and in a transmission path of a beam emitted by a third light source of the four light sources, and the third light guide unit being disposed in a transmission path of a beam emitted by a fourth light source of the four light sources.

9. The optical touch apparatus of claim 8, wherein the at least one light incident surface of the light guide body of the second light guide unit are two light incident surfaces opposite to each other, the second light source and the third light source are respectively disposed next to the two light incident surfaces opposite to each other, the Lambertian scattering structure comprises a plurality of Lambertian scattering patterns divided from each other, and a number density of the Lambertian scattering patterns at a position close to one of the two light incident surfaces is less than a number density of the Lambertian scattering patterns at a position in a middle of the two light incident surfaces.

10. The optical touch apparatus of claim 8, wherein the first surfaces of the light guide units face the sensing space, the at least one optical detector are two optical detectors, a first surface of the first light guide unit and a first surface of the second light guide unit are in a detection range of one of the two optical detectors, and the first surface of the second light guide unit and a first surface of the third light guide unit are in a detection range of the other of the two optical detectors.

11. An optical touch display apparatus, comprising:

a display, having a display area; and an optical touch apparatus, comprising:

at least a light source, disposed next to the display area and capable of providing a beam;

at least a light guide unit, disposed next to the display area and in a transmission path of the beam, the light guide unit comprising:

a light guide body, having a first surface, a second surface opposite to the first surface, at least a light incident surface connecting the first surface and the second surface, a third surface connecting the light incident surface, the first surface, and the second surface, and a fourth surface opposite to the third surface and connecting the light incident surface, the first surface, and the second surface, wherein the beam is capable of entering the light guide body through the light incident surface and is capable of being transmitted from the first surface to a sensing space in front of the display area; and a Lambertian scattering structure, disposed on at least one of the second surface, the third surface, and the fourth surface, such that the beam is scattered to the first surface and a root mean square value of differences between light intensity of a normalized light intensity distribution curve of the beam emitted from the first surface at each light emission angle and light intensity of a Lambertian normalized light intensity distribution curve at the same angle is equal to or less than 0.2; and at least an optical detector, disposed next to the display area and used to detect a change in light intensity of the beam in the sensing space.

12. The optical touch display apparatus of claim 11, wherein the Lambertian scattering structure comprises a plurality of Lambertian scattering patterns divided from each other, each of the Lambertian scattering patterns comprising:

a transparent ink layer; and a plurality of scattering particles, doped in the transparent ink layer.

13. The optical touch display apparatus of claim 12, wherein a ratio of a weight percentage of the scattering particles to a weight percentage of the transparent ink layer is from 0.1 to 1.5.

14. The optical touch display apparatus of claim 11, wherein the optical touch apparatus further comprises a processing unit electrically connected to the optical detector, and the processing unit determines a position of the touch object relative to the display area according to the change in the light intensity when a touch object enters the sensing space.

15. The optical touch display apparatus of claim 11, wherein the Lambertian scattering structure comprises a plurality of Lambertian scattering patterns divided from each other, and a number density of the Lambertian scattering patterns at a position close to the light source is less than a number density of the Lambertian scattering patterns at a position away from the light source.

16. The optical touch display apparatus of claim 11, wherein the Lambertian scattering structure comprises a plurality of Lambertian scattering patterns divided from each other, and the Lambertian scattering patterns are arranged in a direction substantially perpendicular to the light incident surface.

17. The optical touch display apparatus of claim 11, wherein the light guide body further comprises a reflector, disposed on at least one of the second surface, the third surface, and the fourth surface.

18. The optical touch display apparatus of claim 11, wherein the at least one light guide unit are three light guide units, the at least one light source are four light sources, a first light guide unit and a second light guide unit of the three light guide units are respectively disposed at two adjacent sides of the display area, the second light unit and a third light guide unit of the three light guide units are respectively disposed at two adjacent sides of the display area, and the first light guide unit and the third light unit are respectively disposed at two opposite sides of the display area, the first light guide unit being disposed in a transmission path of a beam emitted by a first light source of the four light sources, the second light guide unit being disposed in a transmission path of a beam emitted by a second light source of the four light sources and in a transmission path of a beam emitted by a third light source of the four light sources, and the third light guide unit being disposed in a transmission path of a beam emitted by a fourth light source of the four light sources.

19. The optical touch display apparatus of claim 18, wherein the at least one light incident surface of the light guide body of the second light guide unit are two light incident surfaces opposite to each other, the second light source and the third light source are respectively disposed next to the two light incident surfaces opposite to each other, the Lambertian scattering structure comprises a plurality of Lambertian scattering patterns divided from each other, and a number density of the Lambertian scattering patterns at a position close to one of the two light incident surfaces is less than a number density of the Lambertian scattering patterns at a position in a middle of the two light incident surfaces.

20. The optical touch display apparatus of claim 18, wherein the first surfaces of the light guide units face the sensing space, the at least one optical detector are two optical detectors, a first surface of the first light guide unit and a first surface of the second light guide unit are in a detection range of one of the two optical detectors, and the first surface of the second light guide unit and a first surface of the third light guide unit are in a detection range of the other of the two optical detectors.

* * * * *